United States Patent [19]
Scheier

[11] 3,790,067
[45] Feb. 5, 1974

[54] CONTAINER

[76] Inventor: Stanley C. Scheier, 21 Maple Leaf Ln., Doylestown, Pa. 18901

[22] Filed: Dec. 4, 1970

[21] Appl. No.: 95,140

[52] U.S. Cl......... 229/55, 206/DIG. 34, 220/DIG. 30
[51] Int. Cl............................................. B65d 33/00
[58] Field of Search............... 220/DIG. 30; 229/55; 206/DIG. 34

[56] References Cited
UNITED STATES PATENTS

| | | | |
|---|---|---|---|
| 3,186,869 | 6/1965 | Friedman | 220/DIG. 30 |
| 2,750,027 | 6/1956 | Cummings | 220/DIG. 30 |
| 2,618,575 | 11/1952 | Roswin | 206/DIG. 34 |
| 3,259,301 | 7/1966 | Onasch | 229/55 |

Primary Examiner—William T. Dixson, Jr.
Assistant Examiner—Stephen P. Garbe

[57] ABSTRACT

A container having an inner layer of water-insoluble polymeric material and an outer layer of a water soluble polymeric material. The outer layer comprises the load-bearing member and the inner layer is sufficiently thin to be shredded under normal atmospheric forces or by the weight of material in the container.

6 Claims, 1 Drawing Figure

PATENTED FEB 5 1974 3,790,067
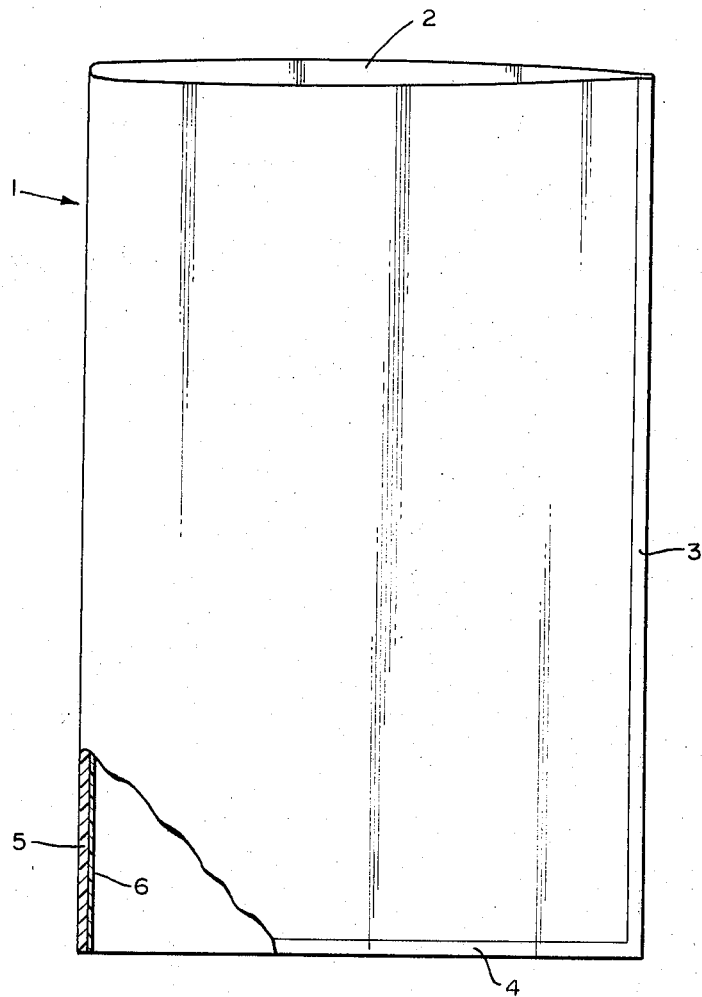
INVENTOR
STANLEY C. SCHEIER
BY
Kenway, Jenney & Hildreth
ATTORNEYS

CONTAINER

This invention relates to a disposable container formed from thermoplastic materials.

At the present time, containers made from thermoplastic material are in wide use, including thin walled bags as well as thick wall containers such as bottles. Generally, these containers are not reuseable and are disposed if once emptied. Unfortunately, thermoplastics employed in forming the containers are very stable and are not degraded under ordinary atmospheric conditions. Accordingly, the accumulation of these materials has caused a substantial disposal problem in that burning has been the primary means for degrading the containers. This of course is undesirable in that an air pollution is caused thereby. Since thermoplastic materials are economically desirable for forming containers, it would be highly desirable to provide a means for disposing of the thermoplastic material forming these containers without causing either a bulk disposal problem or air pollution problem.

In accordance with the present invention there is provided a container formed from two plastic layers, the outer layer being water soluble and the inner layer being non-water soluble. The outer layer is sufficiently thick so that it comprises the primary load-bearing member of the container while the inner layer is sufficiently thin so that when the outer layer is dissolved, it disintegrates under the force of the material in the container or the forces encountered under ordinary atmospheric conditions. Accordingly, the present invention provides a container which, by virtue of its structure, is disposable without causing pollution problems.

The inner layer serves to provide a means for storing any materials including damp or wet materials since it prevents contact of the materials stored with the outer water-soluble layer. However, since the inner layer is not water soluble, it is not degraded under normal atmospheric conditions. Therefore, it must be made sufficiently thin so that it disintegrates under the weight of the material stored in the container or by normal atmospheric conditions after the outer layer has been dissolved. On the other hand, the outer layer is made sufficiently thick to support the load of the material to be stored in the container. The thickness of the outer layer also regulates the time needed to dissolve it. Thus, if it is desired to extend the life of the container, the thickness of the water-soluble layer is increased accordingly. Alternatively, the life of the container can be chemically regulated by altering the solubility of the water soluble layer. Thus, the water solubility of polyvinyl alcohol can be regulated by controlling the amount of hydrolysis that occurs in converting poly (vinyl acetate) to polyvinyl alcohol in a manner well-known.

Suitable water soluble polymeric materials that can be employed as the outer layer are soluble in cold water such as polyvinyl alcohol, carboxymethylcellulose, polyox or the like. These materials can be easily applied as a film or layer onto the water-insoluble layer. Generally, this is accomplished by casting water-soluble film onto the water-insoluble substrate. This can be done either continuously or batch wise. When effected continuously, a solution of the water-soluble polymer is applied to the moving substrate, the non-water soluble component, moving at a rate to effect complete drying of the water-soluble polymer layer before rolling or otherwise storing the resultant multilayer sheet formed. Alternatively, the non-water soluble material, which is normally thermoplastic, can be extruded directly onto the water soluble film from a conventional screw-type extruder. The thickness of the outer layer is governed by the considerations described above. For example, when the multilayer sheet is to be formed into a bag, the outer water-soluble layer generally is between about 0.5 and 2.0 mils thick, more usually between about 0.5 and 1.0 mils. Outer layers of this thickness generally dissolve in normal atmospheric conditions between about 12 and about 48 hours. This permits an adequate time to fill the container and dispose of it before it becomes sufficiently weak as to be unable to support the load of the material therein. The inner layer generally is between about 0.1 and 1.0 mils thick, more usually between about 0.1 and 0.5 mils thick. Suitable materials for the inner layer are those which are water-insoluble and are relatively impermeable to moisture such as saran, polyethylene, polypropylene, polyesters, polyamide or the like. It is preferred to form a bag from a multilayer sheet comprising an inner layer of low density polyethylene and an outer layer of polyvinyl alcohol. The final bag construction is formed by cutting the multilayer sheet to the desired size and joining the sheet by any convenient means such as by heat sealing or adhesive bonding.

Referring to the FIGURE, a bag generally designated as 1 has an open top 2 and a heat sealed bottom 4 and/or side 3. The wall of the bag 1 comprises an outer layer 5 formed from a water-soluble polymeric material and a water-insoluble inner layer 6. In use, the bag 1 is filled with refuse or any other material desired so that when the bag and the contained material is discarded, the outer layer 5 gradually dissolves under normal atmospheric conditions and the inner layer 6 becomes disintegrated by virtue of the weight of the material contained therein so that it becomes shredded under normal atmospheric conditions.

The following example more particularly describes the present invention and is not intended to limit the same.

EXAMPLE I

A bag comprising an inner layer of polyethylene and an outer layer of polyvinyl alcohol is made as follows: a polyethylene film about 0.25 mils. thick is placed on a moving apron and an aqueous solution of polyvinyl alcohol is poured onto the polyethylene layer. The polyvinyl alcohol is allowed to dry to form a layer about 1.0 mils thick. The resultant multilayer sheet is cut along the edges to render the polyvinyl alcohol and polyethylene layers contiguous and is cut along the width to form the desired bag length. The sheet is then folded with the polyethylene forming the inside surface. The outer side edges that are contacted are heat-sealed thereby forming a bag. The bag is stored in a relatively dry atmosphere to prevent dissolution of the outer layer prior to use.

A thermoplastic material, such as low density polyethylene, is extruded from the outer opening of a circular die having two concentric circular openings. Dry water-soluble polyvinyl alcohol is passed through the inner opening to form a tube that contacts the inner surface of the semi-molten polyethylene tube. The two materials contact and adhere while the extruded material is still in a semi-molten state. After cooling, the resultant continuous two layered tube can be cut into lengths and sealed by heat or adhesive sealing techniques along the one open edge to form a bag.

I claim:

1. A container comprising a hole-free outer layer of a water-soluble polymeric composition and a hole-free inner layer of a water-insoluble polymeric composition having structural characteristics which are maintained when it is contacted with water, said outer layer comprising the load-bearing member of said containe and container inner layer having a thickness between about 0.1 and 1.0 mils., said inner and outer layers being the only layers of said container and said container having an opening to permit it to be filled.

2. The container of claim 1 wherein said outer layer comprises polyvinyl alcohol.

3. The container of claim 1 wherein said inner layer comprises a copolymer of vinylidene chloride and acrylonitrile.

4. The container of claim 2 wherein said inner layer comprises a copolymer of vinylidene chloride and acrylonitrile.

5. The container of claim 1 wherein the inner layer comprises low density polyethylene.

6. The container of claim 2 wherein the inner layer comprises low density polyethylene.

* * * * *

UNITED STATES PATENT OFFICE
CERTIFICATE OF CORRECTION

Patent No. 3,790,067        Dated February 5, 1974

Inventor(s) Stanley C. Sheier

It is certified that error appears in the above-identified patent and that said Letters Patent are hereby corrected as shown below:

In claim 1, column 3, line 9 change "containe" to --container--

In claim 1, column 3, line 10 change "container" to --said--

Signed and sealed this 7th day of May 1974.

(SEAL)
Attest:

EDWARD M. FLETCHER, JR.
Attesting Officer

C. MARSHALL DANN
Commissioner of Patents